(12) United States Patent
Narsale et al.

(10) Patent No.: US 11,372,763 B2
(45) Date of Patent: Jun. 28, 2022

(54) PREFETCH FOR DATA INTERFACE BRIDGE

(71) Applicant: Micron Technology, Inc., Boise, ID (US)

(72) Inventors: Ashay Narsale, Newark, CA (US); Robert Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 44 days.

(21) Appl. No.: 16/928,766

(22) Filed: Jul. 14, 2020

(65) Prior Publication Data

US 2022/0019536 A1 Jan. 20, 2022

(51) Int. Cl.
*G06F 12/0862* (2016.01)
*G06F 13/42* (2006.01)
*G06F 13/16* (2006.01)

(52) U.S. Cl.
CPC ...... *G06F 12/0862* (2013.01); *G06F 13/1668* (2013.01); *G06F 13/4282* (2013.01); *G06F 2213/0026* (2013.01)

(58) Field of Classification Search
CPC ............. G06F 12/0862; G06F 13/1668; G06F 13/4282; G06F 2213/0026
See application file for complete search history.

(56) References Cited

U.S. PATENT DOCUMENTS

| | | | |
|---|---|---|---|
| 8,589,632 B1 * | 11/2013 | Gupta ................. | G06F 13/4059 711/147 |
| 2004/0064649 A1 * | 4/2004 | Volpe .................. | G06F 12/0862 711/137 |
| 2008/0059715 A1 | 3/2008 | Tomita et al. | |
| 2008/0183903 A1 * | 7/2008 | VanStee ............... | G06F 13/161 710/5 |
| 2009/0100206 A1 * | 4/2009 | Wang .................. | G06F 13/4031 710/112 |
| 2011/0314228 A1 | 12/2011 | Blake et al. | |
| 2012/0159072 A1 * | 6/2012 | Hida ................... | G06F 12/0862 711/119 |
| 2013/0019065 A1 * | 1/2013 | Floman ............... | G06F 12/0862 711/137 |
| 2018/0113825 A1 * | 4/2018 | Huggins ............... | G06F 13/102 |
| 2019/0384529 A1 * | 12/2019 | Eliash ................. | G06F 3/0613 |
| 2020/0117462 A1 * | 4/2020 | Jin ....................... | G06F 9/3861 |
| 2022/0019535 A1 | 1/2022 | Narsale | |

OTHER PUBLICATIONS

U.S. Appl. No. 16/928,729, filed Jul. 14, 2020, Prefetch Buffer of Memory Sub-System.

* cited by examiner

*Primary Examiner* — Eric T Oberly
(74) *Attorney, Agent, or Firm* — Schwegman Lundberg & Woessner, P.A.

(57) ABSTRACT

Various embodiments described herein provide for using a prefetch buffer for a data interface bridge, which can be used with a memory sub-system to increase read access or sequential read access of data from a memory device coupled to the data interface bridge.

20 Claims, 8 Drawing Sheets

PREFETCH FOR DATA INTERFACE BRIDGE

TECHNICAL FIELD

Embodiments of the disclosure relate generally to memory devices, and more specifically, relate to a sequence for a prefetch buffer for a data interface bridge, which can be used with a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
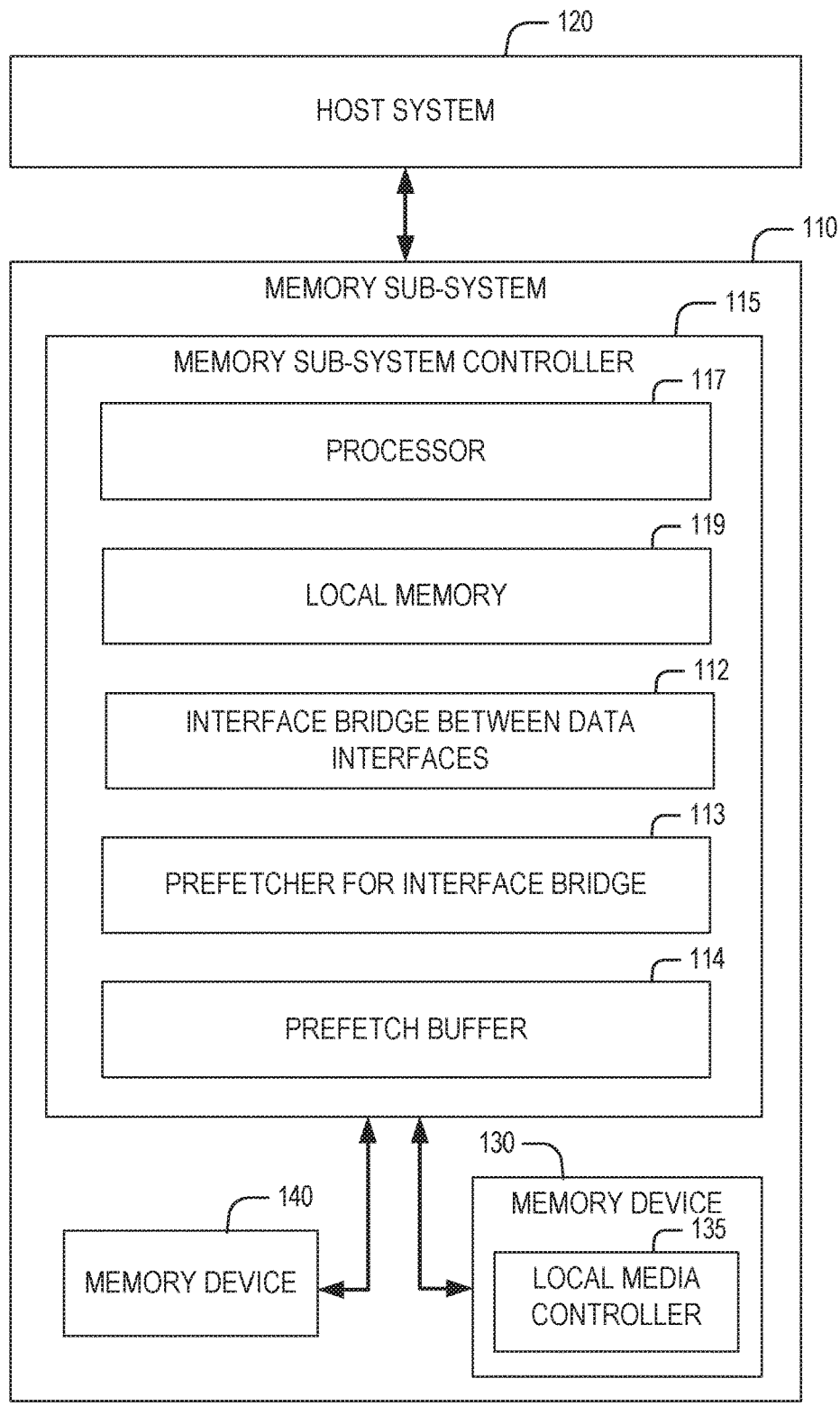
FIG. 1 illustrates an example computing environment that includes a memory sub-system, in accordance with some embodiments of the present disclosure.

Aspects of the present disclosure are directed to using a prefetch buffer for a data interface bridge, which can be used with a memory sub-system to increase read access or sequential read access of data from a memory device coupled to the data interface bridge. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

A memory device can be a non-volatile memory device. A non-volatile memory device is a package of one or more die. Each die can be comprised of one or more planes. For some types of non-volatile memory devices (e.g., NAND devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally (for example, by an external controller). The memory devices can be managed memory devices (e.g., managed NAND), which are raw memory devices combined with local embedded controllers for memory management within the same memory device package.

To facilitate access of a target device having a specific type of data interface, a host system or a memory sub-system can use a data interface bridge (hereafter, interface bridge) that enables the host system/memory sub-system to access the target device using another type of data interface. For instance, with respect to one or more devices comprising a data interface according to a Peripheral Component Interconnect Express (PCI-E or PCIe) standard (e.g., data interface comprises a PCI-E physical layer), a host system or a memory sub-system controller can use a traditional interface bridge to access (e.g., read access) data from the one or more individual devices using a data interface in accordance with a different data interface standard, such as a Double Data Rate (DDR) memory standard (e.g., DDR4 memory standard, where the other data interface comprises a DDR4 physical layer).

Aspects of the present disclosure improve data access of a device (e.g., a memory device) through an interface bridge that includes a prefetch buffer for storing data prefetched from the device. For some embodiments, the prefetch buffer is effectively placed/used between two interfaces (of different types) of an interface bridge to speed up read access through the interface bridge. For example, the interface bridge can comprise a deterministic data interface, such as a data interface in accordance with a DDR memory standard, and a non-deterministic data interface, such as a data interface in accordance with a PCI-E standard. According to some embodiments, data is prefetched from a device (e.g., memory device) coupled to the non-deterministic data interface of the interface bridge, where the prefetch can be based on satisfaction of one or more criteria, which may or may not be defined by a prefetch policy. For various embodiments, the prefetched data is stored on the prefetch buffer. Eventually, the prefetched data stored on the prefetch buffer can be accessed, through the deterministic data interface of the interface bridge, by a device (e.g., a host system, a memory sub-system controller, or a processing device of a memory sub-system controller) coupled to the deterministic data interface. Depending on the embodiment, the prefetch buffer can comprise one or more static random access memory (SRAM) devices, dynamic random access memory (DRAM) devices, registers, or set-associative caches (e.g., an N-way set-associative cache, such as a two-way set-associative cache).

For some embodiments, the prefetch buffer for the interface bridge is a write-through buffer. Accordingly, where the interface bridge is coupled between a target device and a host system or memory sub-system controller (e.g., a processing device thereof), where a data write request for the target device is received from the host system/memory sub-system controller by the interface bridge, and where the data write request results in a write hit on the prefetch buffer, the data of the data write request can be written to both the prefetch buffer and the target device (e.g., where the target device is a memory device, to the sectored cache or page cache of the target device).

Compared to interface bridges that do not use a prefetch buffer as described herein, use of various embodiments can increase read access or sequential read access of data from a device coupled to a data interface (e.g., non-deterministic data interface) of the interface bridge. For example, with respect to a host system or a memory sub-system controller that uses an interface bridge to access data from a PCI-E memory device (e.g., PCI-E memory device comprising three-dimensional (3D) cross point memory media or NAND-type memory media) using a non-PCI-E data interface, such as a DDR (e.g., DDR4) data interface, various embodiments can reduce the latency of sequential read access hits by using a prefetch buffer to store prefetched data from the PCI-E device. With use of the prefetch buffer, when a read access request from the host system/memory sub-system controller results in a read access hit on the prefetch buffer, the interface bridge can respond to the request by providing the requested data from the prefetch buffer, rather than having to provide the request data from the PCI-E device.

As used herein, a data interface bridge (or interface bridge) comprises a component having logic to bridge communication between hardware data interfaces that operate in accordance with different (e.g., incompatible) data interface standards (e.g., deterministic and non-deterministic data interface standards). For example, a given interface bridge can enable a host system or memory sub-system controller (e.g., a processing device thereof) to use a non-PCI-E data interface, such as a DDR data interface, to communicate data with a target device having a PCI-E data interface.

According to some embodiments, an interface bridge couples a processing device of a memory sub-system (e.g., of memory sub-system controller) to a memory device of the memory sub-system. For example, the interface bridge can form part of a memory sub-system controller or can form part of the memory sub-system while being external to the memory sub-system controller (e.g., within the memory sub-system, the interface bridge is coupled between the memory sub-system controller and the memory device). Based on a set of criteria (e.g., defined by a prefetch policy), the interface bridge can cause data (e.g., one or more sectors or pages of data) to be prefetched into the prefetch buffer of the interface bridge, from the memory device, prior to any portion of the data being requested for reading by the processing device of the memory sub-system controller coupled to the interface bridge. For instance, where a memory sub-system of an embodiment receives a data read request from a host system for a specified memory address, the processing device of the memory sub-system controller can generate and send a corresponding data read request to the memory device via the interface bridge. If the corresponding data read request results in a read hit on the prefetch buffer, the interface bridge can respond by prefetching data from one or more sequential memory addresses that sequentially follow the specified memory address (e.g., prefetch the next 64 or 128 bytes of data) from the memory device (e.g., the NAND-type memory device) to the prefetch buffer. In doing so, if the interface bridge subsequently receives, from the processing device (of the memory sub-system controller), a data read request for data from at least one of those sequential memory addresses, the data read request would result in a read hit on the prefetch buffer and the interface bridge can provide the requested data from the prefetch buffer, rather than having to obtain the requested data from the memory device. For various embodiments, providing the requested data from the prefetch buffer can result in faster read access (which can also achieve more read bandwidth) than providing the requested data from the memory device, especially in situations where the host system is accessing data sequentially (e.g., requesting data reads from sequential memory addresses).

As used herein, prefetching data to a prefetch buffer of an interface bridge can comprise fetching (e.g., copying) data from one device (e.g., a non-volatile memory device) to the prefetch buffer of the interface bridge prior to the interface bridge receiving a data access request from another device (e.g., host system or a processing device of a memory sub-system controller) with respect to that data. For instance, one or more sectors of data (e.g., 128 bytes) can be fetched (e.g., copied) from a memory device to the prefetch buffer, prior to the interface bridge receiving a data read request from a host system or memory sub-system controller (e.g., processing device thereof) to explicitly fetch and provide the one more sectors to the host system. In another instance, one or more pages of data (e.g., 64 bytes) can be fetched (e.g., copied) from the memory device to the prefetch buffer, prior to the interface bridge receiving a data read request from the host system/memory sub-system controller to explicitly fetch and provide the one more pages to the host system.

As used herein, with respect to a data read request (e.g., from a host system to a memory sub-system), a read hit with respect to a prefetch buffer can refer to a condition where the prefetch buffer can satisfy the data read request (e.g., the prefetch buffer is currently storing a valid copy of the data requested by the data read request), and a read miss with respect to the prefetch buffer can refer to a condition where the prefetch buffer cannot satisfy the data read request (e.g., the prefetch buffer is not currently storing a copy of the data requested by the data read request, or the copy is invalid). Additionally, as used herein, write hits and write misses can refer to similar situations for prefetch buffers, but with respect to data write requests from a host system or a memory sub-system controller (e.g., processing device thereof).

As used herein, a prefetch buffer can comprise a set-associative cache. For instance, a prefetch buffer of an embodiment can implement an N-way set-associative cache, such as a two-way set-associative cache. Within the prefetch buffer, hit or miss detection for data associated with a specific memory address can comprise determining a tag based on the specific memory address and an associative search of tags within the cache memory device.

Though various embodiments are described herein with respect to an interface bridge forming part of a memory sub-system, for some embodiments, the interface bridge is external to a memory sub-system and can be used to couple a host system to a memory sub-system (or another device).

Disclosed herein are some examples of systems for using a prefetch buffer for an interface bridge, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing environment 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller. SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS). Small Computer System Interface (SCSI), a double data rate (DDR) memory bus, a dual in-line memory module (DIMM) interface (e.g., DIMM socket interface that supports Double Data Rate (DDR)). Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs. QLCs. or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host system, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes an interface bridge 112 between data interfaces (hereafter, the interface bridge 112), a prefetcher 113 for interface bridge (hereafter, the prefetcher 113), and a prefetch buffer 114. For some embodiments, one or both of the memory devices 130, 140 operate a device of the memory sub-system 110 coupled to the processor 117 via the interface bridge 112. The prefetch buffer 114 can comprise one or more SRAM devices, one or more registers, or one or more set of set-associative caches. Additionally, for some embodiments, the prefetcher 113 enables or facilitates prefetching data to the prefetch buffer 114 according to methodologies described herein.

According to some embodiments, the memory sub-system 110 receives, from the host system 120, a request to read first data from a data storage location on one of the memory devices 130, 140 that corresponds to a specified memory address, which can be provided in association with the request. Based on the request from the host system 120, the processor 117 (of the memory sub-system controller 115) can generate one or more data read requests for one or more of the memory devices 130, 140 to read the first data from the host system 120. To do so, according to some embodiments, the processor 117 sends the one or more data read requests to the interface bridge 112, and the interface bridge 112 responds to the one or more data read requests by providing, based on the memory address, the first data to the processor 117 from one of the prefetch buffer 114 or one or more of the memory devices 130, 140 (serving as a non-cache memory device). For instance, if the one or more data read requests to read the first data (from one or more of the memory devices 130, 140) results in a read hit with the prefetch buffer 114, the first data can be provided to the processor 117 from the prefetch buffer 114. If the one or more data read requests to read the first data (from one or more of the memory devices 130, 140) results in a read miss with the prefetch buffer 114, the first data can be provided to the processor 117 from one or more of the memory devices 130, 140. For instance, the interface bridge 112 can provide the first data from one or more of the memory devices 130, 140 by copying (e.g., fetching) the first data from one or more of the memory devices 130, 140 to the prefetch buffer 114, and then providing the first data to the processor 117 from the prefetch buffer 114.

For some embodiments, the prefetcher 113 enables the interface bridge 112 to further respond to the one or more data read requests received from the processor 117 by determining whether the first data is provided to the processor 117 from at least one of the prefetch buffer 114 or one of the memory devices 130, 140. As noted herein, the prefetch buffer 114 provides the first data to the processor 117 if it is determined that the one or more data read requests received from the processor 117 results in a read hit for the prefetch buffer 114. One of the memory devices 130, 140 provides the first data to the processor 117 if it is determined that the one or more data read requests received from the processor 117 results in a read miss for the prefetch buffer 114.

For some embodiments, the prefetcher 113 enables the memory sub-system controller 115 to further respond to the one or more data read requests received from the processor 117 by prefetching second data from one or more of the memory devices 130, 140 to the prefetch buffer 114 based on a set of criteria (e.g., defined by a prefetch policy) and based on determining whether the first data is provided to the processor 117 from at least one of the prefetch buffer 114 or one of the memory devices 130, 140. According to various embodiments, the second data (being prefetched to the prefetch buffer 114) is stored on one of the memory devices 130, 140 at a set of data storage locations corresponding to a set of sequential memory addresses that sequentially follow the specified memory address. The amount of data (i.e., the size of the second data) prefetched to the prefetch buffer 114 can depend on a depth of prefetch (prefetch depth) setting. The prefetch depth setting can define, for example, the number of sequential memory addresses in the set of sequential memory addresses, which can determine the size of the second data. For some embodiments, the prefetch depth setting can be defined by the prefetch policy, can be predefined (e.g., by the manufacturer), can be defined using one or more registers, or can be dynamically set.

For various embodiments, the prefetch policy defines one or more criteria that, when satisfied, cause the second data to be prefetched to the prefetch buffer 114. For example, the prefetch policy can be defined such that, in response to the first data being provided from the prefetch buffer 114 in response to the first data being provided from the prefetch buffer 114 (e.g., read hit on the prefetch buffer 114) to processor 117, the second data can be copied from one or more of the memory devices 130, 140 to the prefetch buffer 114. The prefetch policy can be defined such that, in response to the second data being provided from the prefetch buffer 114 (e.g., read hit on the prefetch buffer 114) to the processor 117, third data (representing additional prefetch data) can be copied from one or more of the memory devices 130, 140 to the prefetch buffer 114. Additionally, the prefetch policy can be defined such that in response to every read request, data from the next address can be prefetched to the prefetch buffer 114 (e.g., copied from the one or more of the memory devices 130, 140 to the prefetch buffer 114).

According to some embodiments, the memory sub-system 110 receives, from the host system 120, a request to write first data to a data storage location on one of the memory devices 130, 140 that corresponds to a specified memory address, which can be provided in connection with or as part of the request. Based on the request from the host system 120, the processor 117 (of the memory sub-system controller 115) can generate one or more data write requests for one or more of the memory devices 130, 140 to write the first data from the host system 120. To do so, according to some embodiments, the processor 117 sends the one or more data write requests to the interface bridge 112, and the interface bridge 112 responds to the one or more data write requests by determining whether the first data is currently stored on the prefetch buffer 114 (e.g., determining whether the one or more data write requests result in a write hit with the prefetch buffer 114). Additionally, for some embodiments, the prefetcher 113 enables the interface bridge 112 to respond to determining that the first data is currently stored on the prefetch buffer 114 (e.g., determine a write hit exists with the prefetch buffer 114) by writing the first data to at least both the prefetch buffer 114 and one or more of the memory devices 130, 140.

Though the prefetcher 113 and the prefetch buffer 114 are illustrated as separate from the interface bridge 112, the prefetcher 113, the prefetch buffer 114, or both can be implemented (at least in part) as a component of the interface bridge 112. Additionally, though the interface bridge 112 is illustrated as part of the memory sub-system controller 115, for some embodiments the interface bridge 112 can be implemented as a component of the memory sub-system 110 that is separate from the memory sub-system controller 115.

Figure 2:
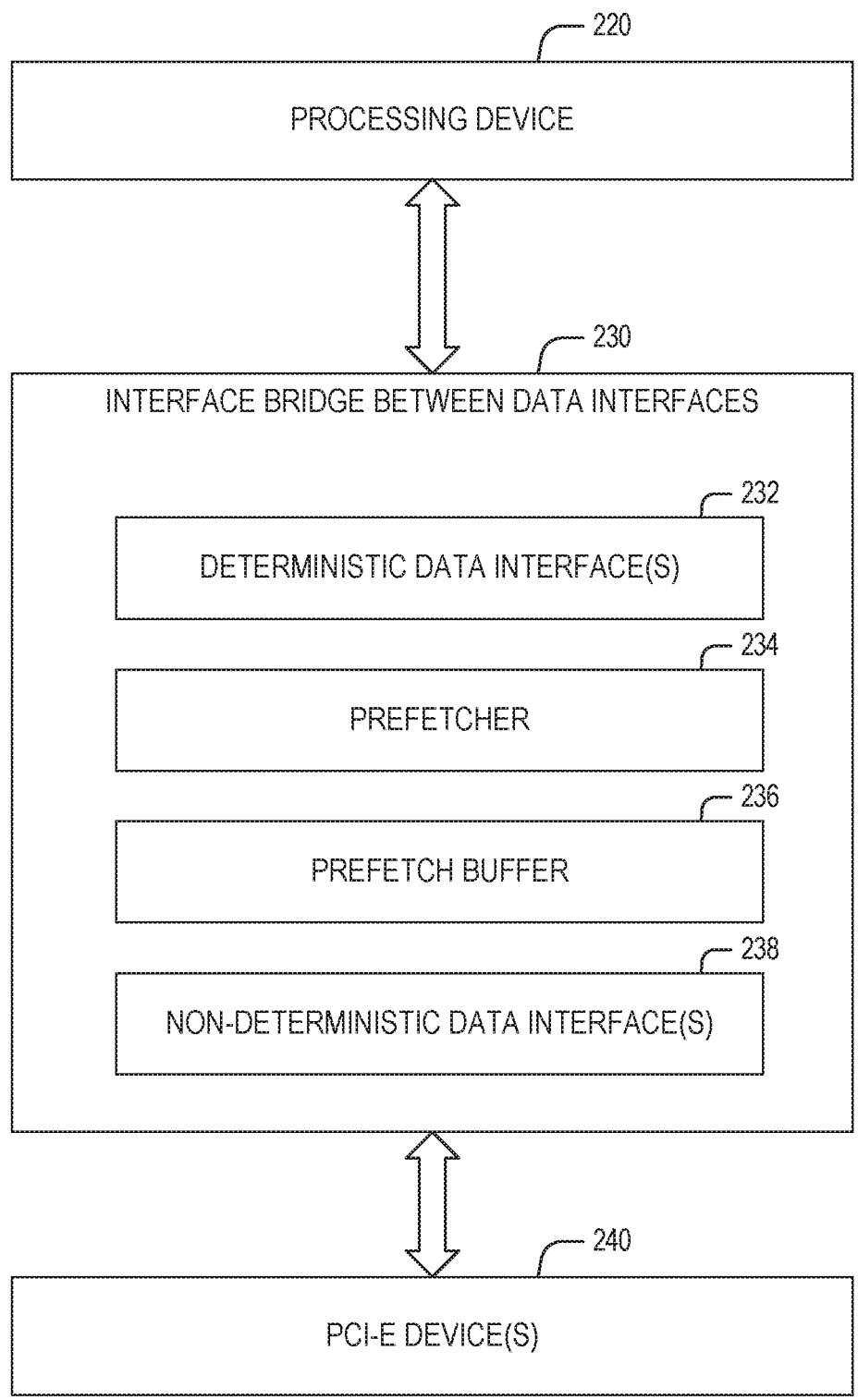
FIG. 2 is a diagram illustrating an example of an interface bridge between data interfaces with a prefetch buffer, in accordance with some embodiments of the present disclosure.

FIG. 2 is a diagram illustrating an example of an interface bridge 230 between data interfaces (hereafter, interface bridge 230) with a prefetch buffer, in accordance with some embodiments of the present disclosure. In FIG. 2, a processing device 220 is coupled to one or more PCI-E devices 240 via the interface bridge 230. Though FIG. 2 is described with respect to the one or more PCI-E devices 240, some embodiments can involve devices having a data interface in accordance with a different data interface standard. As shown, the interface bridge 230 comprises one or more deterministic data interfaces 232, a prefetcher 234, a prefetch buffer 236, and one or more non-deterministic data interfaces 238. The prefetcher 234 enables the interface bridge 230 to perform in accordance with various embodiments described herein with respect to the prefetch buffer 236. The processing device 220 can represent one of a host system (e.g., 120) or a memory sub-system (e.g., 117). Examples of the one or more deterministic data interfaces 232 can include, without limitation, one or more memory data interfaces, such as those in accordance with a DDR memory standard (e.g., a DDR4 memory standard). Accordingly, the one or more deterministic data interfaces 232 can include a data interface comprising a DDR4 physical layer. Examples of the one or more non-deterministic data interfaces 238 can include, without limitation, one or more data interfaces (e.g., device interfaces) in accordance with a PCI-E standard. Accordingly, the one or more non-deterministic data interfaces 238 can include a data interface comprising a PCI-E physical layer. Examples of the one or more PCI-E devices 240 can include, without limitation, a non-volatile memory device, such as a three-dimensional cross-point memory device or a NAND-type memory device.

FIGS. 3 through 6 are flow diagrams of example methods for a prefetch buffer for a data interface bridge, in accordance with some embodiments of the present disclosure. The methods 300, 400, 500, 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 300, 400, 500, 600 is performed by the interface bridge 112 (or a processing device of the interface bridge 112) of FIG. 1 based on the prefetcher 113. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For some embodiments, one or more of the methods 300, 400, 500, 600 are performed with respect to a memory sub-system (e.g., 110) comprising an interface bridge (e.g., 112), a set of prefetch buffers (e.g., 114), a processor (e.g., 117) operating as a first device coupled to the interface bridge, and a memory device (e.g., 130, 140) operating as a second device coupled to the interface bridge.

Figure 3:
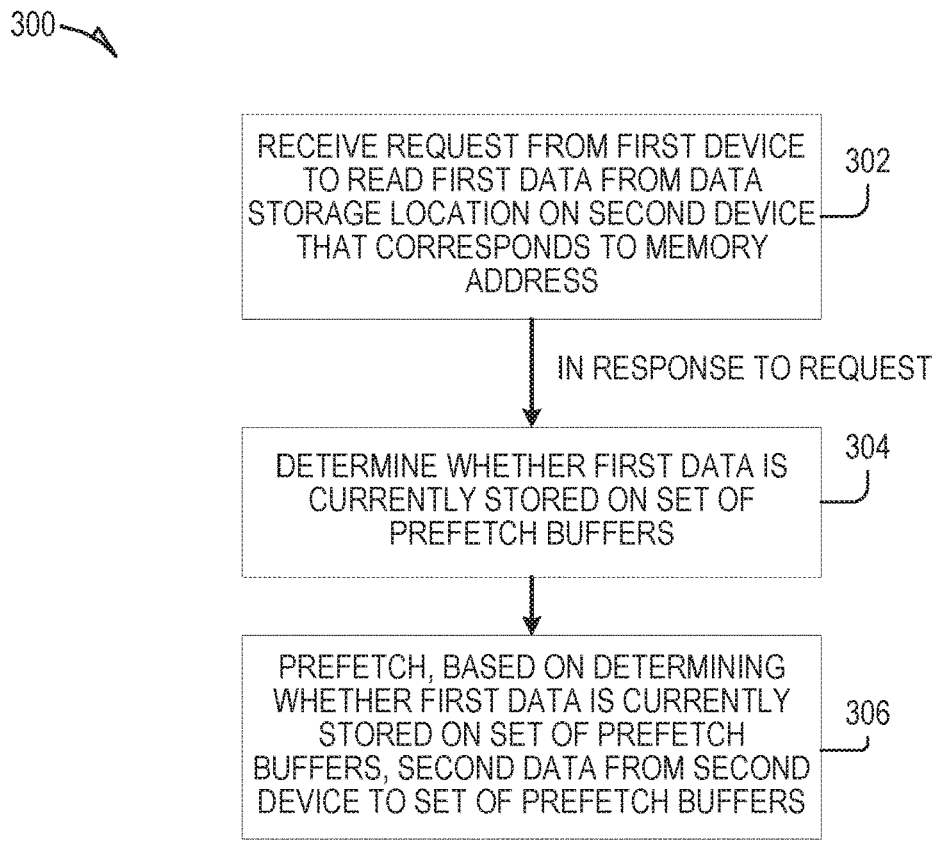
FIGS. 3 through 6 are flow diagrams of example methods for a prefetch buffer for a data interface bridge, in accordance with some embodiments of the present disclosure.

Referring now to the method 300 of FIG. 3, at operation 302, an interface bridge (e.g., 112) receives, from a first device (e.g., 117) coupled to a first data interface of the interface bridge, a request to read first data from a data storage location on a second device (e.g., 130, 140) coupled to a second data interface of the interface bridge, where the data storage location corresponds to a memory address. For some embodiments, the memory address is received from the first device in connection with, or as part of, the request received by operation 302. For various embodiments, the request is received by the interface bridge (e.g., 112) from the first device (e.g., 117) by the first data interface of the interface bridge (e.g., 112).

At operation 304, the interface bridge (e.g., 112) responds to the request of operation 302 by determining, based on the memory address, whether the first data is currently stored on the set of prefetch buffers (e.g., determine whether the request results in read hit on the prefetch buffer 114).

At operation 306, the interface bridge (e.g., 112) prefetches second data from the second device (e.g., 130, 140) to the set of prefetch buffers (e.g., 114) based on a prefetch policy and based on the determination (by operation 304) of whether the first data is currently stored on the set of prefetch buffers (e.g., 114). According to some embodiments, the second data (prefetched to the set of prefetch buffers) is stored on the second device (e.g., 130, 140) at a set of data storage locations corresponding to a set of sequential memory addresses, where the set of sequential memory addresses sequentially follows the memory address (associated with the request received by operation 302). For various embodiments, the second data is prefetched from the second device (e.g., 130, 140) by the second data interface of the interface bridge (e.g., 112).

For some embodiments, in response to determining (at operation 304) that the first data is currently stored on the set of prefetch buffers (e.g., determining that the request results in a read hit on the prefetch buffer 114), the interface bridge (e.g., 112) prefetches the second data from the second device (e.g., 130, 140) to the set of prefetch buffers (e.g., 114) by copying the second data from the second device (e.g., 130, 140) to the set of prefetch buffers (e.g., 114).

However, at operation 304, the interface bridge (e.g., 112) can determine that the first data is not currently stored on the set of prefetch buffers (e.g., determining that the request results in a read miss on the prefetch buffer 114). In response to this determination, the interface bridge (e.g., 112) can prefetch the second data from the second device (e.g., 130, 140) to the set of prefetch buffers (e.g., 114) by copying at least the second data, from the set of data storage locations on the second device (e.g., 130, 140) corresponding to the set of sequential memory addresses, to the set of prefetch buffers (e.g., 114). In doing so, some embodiments can prefetch a next sequence of data prior to that data being prefetched from the second device to the prefetch buffer.

Figure 4:
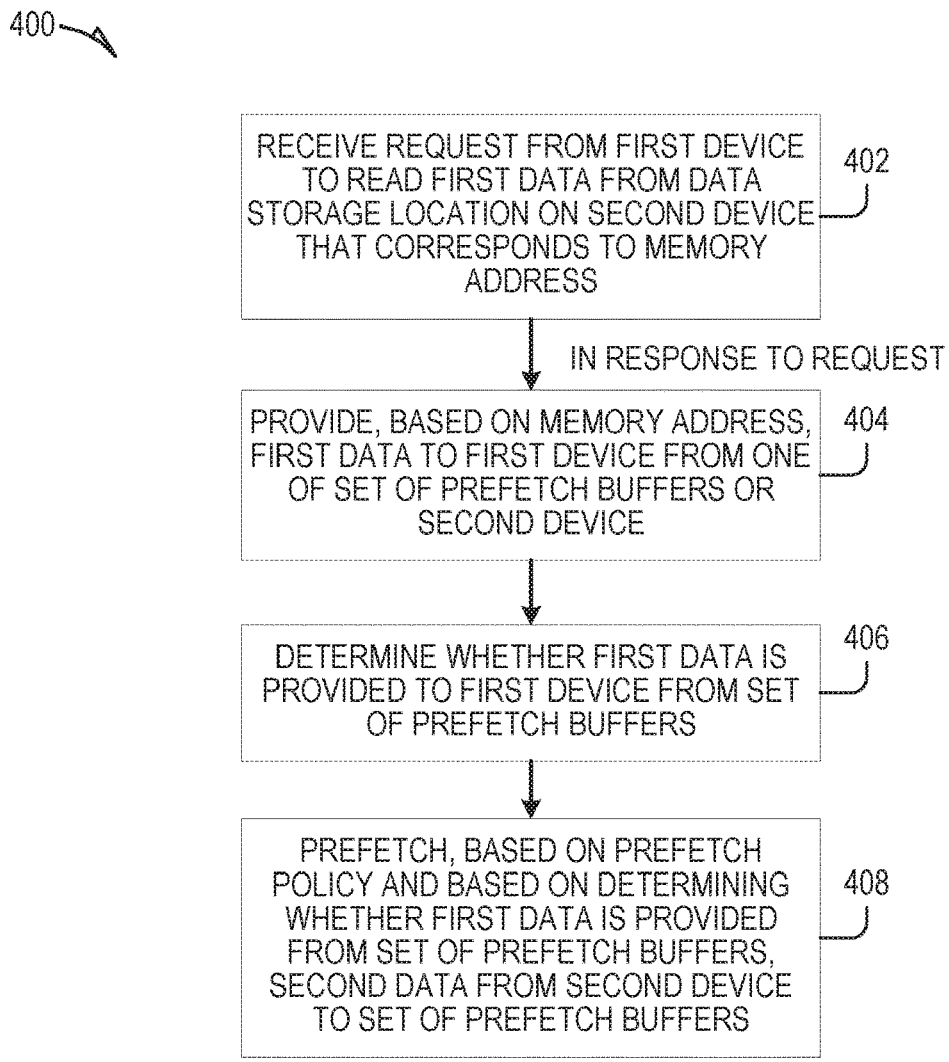

Referring now to the method 400 of FIG. 4, operation 402 is similar to operation 302 described with respect to the method 300 of FIG. 3. At operation 404, the interface bridge (e.g., 112) responds to the request of operation 402 by providing, based on the memory address, the first data to the first device (e.g., 117) from one of the set of prefetch buffers (e.g., 114), the second device (e.g., 130, 140).

For some embodiments, operation 404 comprises the interface bridge (e.g., 112) determining, based on the memory address, whether the first data is currently stored on the set of prefetch buffers (e.g., determining whether the request results in a read hit on the prefetch buffer 114); and in response to determining that the first data is currently stored on the set of prefetch buffers, providing the first data from the set of prefetch buffers to the first device (e.g., 117). For various embodiments, the first data is provided to the first device (e.g., 117) by the first data interface of the interface bridge (e.g., 112).

For some embodiments, operation 404 comprises the interface bridge (e.g., 112) determining, based on the memory address, whether the first data is currently stored on the set of prefetch buffers (e.g., determining whether the request results in a read hit on the prefetch buffer 114); and in response to determining that the first data is not currently stored on the set of prefetch buffers, determining, based on the memory address, the interface bridge (e.g., 112) can provide the first data from the second device (e.g., 130, 140) to the first device (e.g., 117). For some embodiments, the providing the first data from the second device to the first device comprises copying the first data from the second device to the set of prefetch buffers, and providing the copy of the first data from the set of prefetch buffers. For various embodiments, the first data is copied from the second device (e.g., 130, 140) by the second data interface of the interface bridge (e.g., 112).

At operation 406, the interface bridge (e.g., 112) determines whether the first data is provided (by operation 404) to the first device (e.g., 117) from at least one of the set of prefetch buffers (e.g., 114) or the second device (e.g., 130, 140).

At operation 408, the interface bridge (e.g., 112) prefetches second data from the second device (e.g., 130, 140) to the set of prefetch buffers (e.g., 114) based on a prefetch policy and based on the determination (by operation 404) of whether the first data is provided from at least one of the set of prefetch buffers (e.g., 114) or the second device (e.g., 130, 140). For some embodiments, the second data is stored on the second device at a set of data storage locations corresponding to a set of sequential memory addresses, and the set of sequential memory addresses sequentially follows the memory address.

For some embodiments, in response to determining (at operation 406) that the first data is provided to the first device (e.g., 117) from the set of prefetch buffers (e.g., 114), the interface bridge (e.g., 112) prefetches the second data from the second device (e.g., 130, 140) to the set of prefetch buffers (e.g., 114) by copying the second data from the second device (e.g., 130, 140) to the set of prefetch buffers (e.g., 114).

However, at operation 406, the interface bridge (e.g., 112) can determine that the first data is provided to the first device (e.g., 117) from the second device (e.g., 130, 140). In response to this determination, the interface bridge (e.g., 112) can fetch the second data from the second device (e.g., 130, 140) to the set of prefetch buffers (e.g., 114) (if it has not already happened as part of operation 404) by copying at least the second data, from the set of data storage locations on the second device (e.g., 130, 140) corresponding to the set of sequential memory addresses, to the set of prefetch buffers (e.g., 114). Additionally, the interface bridge (e.g., 112) can further prefetch third data, from a second set of data storage locations on the second device (e.g., 130, 140) corresponding to a second set of sequential memory addresses, to the set of prefetch buffers (e.g., 114), where the second set of sequential memory addresses sequentially follows the set of sequential memory addresses. In doing so, some embodiments can prefetch a next sequence of data prior to the second data being provided from the set of prefetch buffers (e.g., 114) to the first device (e.g., 17).

Figure 5:
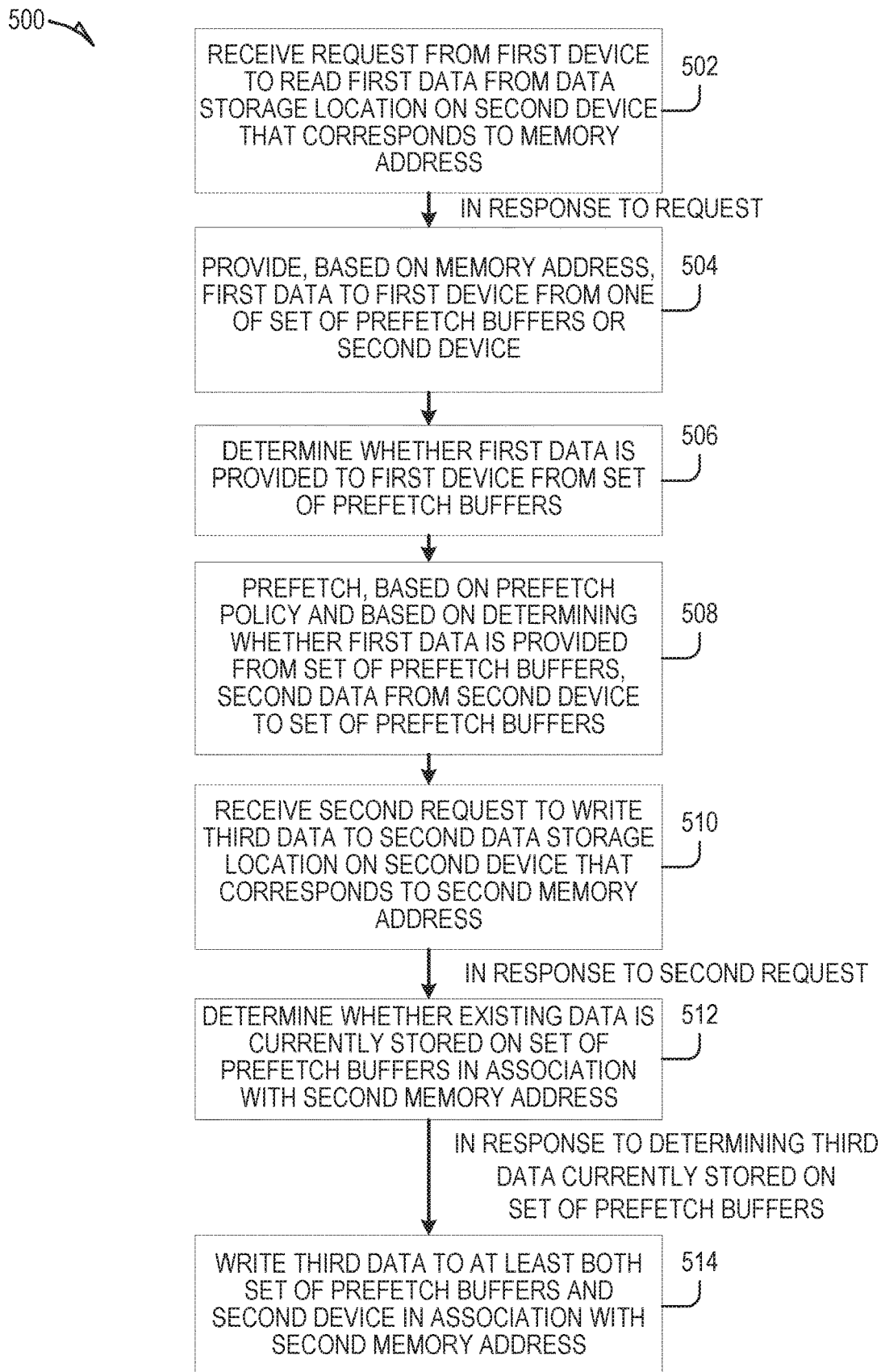

Referring now to the method 500 of FIG. 5, operations 502 through 508 are respectively similar to operations 402 through 408 described with respect to the method 400 of FIG. 4. At operation 510, the interface bridge (e.g., 112) receives, from the first device (e.g., 117), a second request to write third data to second storage location on the second device (e.g., 130, 140) corresponding to a second memory address. For instance, the write request can be to overwrite or update the first data (provided by operation 504 in response to the request received by operation 502) with the third data.

At operation 512, the interface bridge (e.g., 112) responds to the second request of operation 510 by determining whether existing data is currently stored on the set of prefetch buffers (e.g., determine whether the second request results in write hit on the prefetch buffer 114) in association with the second memory address.

At operation 514, the interface bridge (e.g., 112) responds to the determination (by operation 512) that that existing data is currently stored on the set of prefetch buffers (e.g., 114) in association with the second memory address by writing the third data to at least both the set of prefetch buffers (e.g., 114) and the second device (e.g., 130, 140) in association with the second memory address. For instance, the third data can be first written to the set of prefetch buffers (e.g., 114), and then be written from the set of prefetch buffers to the second device (e.g., 130, 140). In this way, the prefetch buffer (e.g., 114) can operate as a write-through buffer for some embodiments. For various embodiments, the third data is written to the second device (e.g., 130, 140) by the second data interface of the interface bridge (e.g., 112).

Though not illustrated, for some embodiments, the interface bridge (e.g., 112) receives an instruction from the first device (e.g., 117) to enable or disable prefetching of data (from the second device (e.g., 130, 140)) to the set of prefetch buffers (e.g., 114). For example, where a host system (e.g., host-side software) determines that the host system is requesting more sequential reads than non-sequential reads (e.g., random access reads), the host system can send an instruction to the memory sub-system to enable prefetching of data to the set of prefetch buffers (e.g., 114). This instruction can be received by the processor (e.g., 117) of the memory sub-system, and the processor (e.g., 117) can send a corresponding instruction to the interface bridge (e.g., 112) to enable prefetch. Alternatively, where the host system (e.g., host-side software) determines that the host system is requesting more non-sequential reads (e.g., random access reads) than sequential reads, the host system can send an instruction to the memory sub-system (e.g., and received by the processor 117) to disable prefetching of data to the set of prefetch buffers (e.g., 114). This instruction can be received by the processor (e.g., 117) of the memory sub-system, and the processor (e.g., 117) can send a corresponding instruction to the interface bridge (e.g., 112) to disable prefetch.

Figure 6:
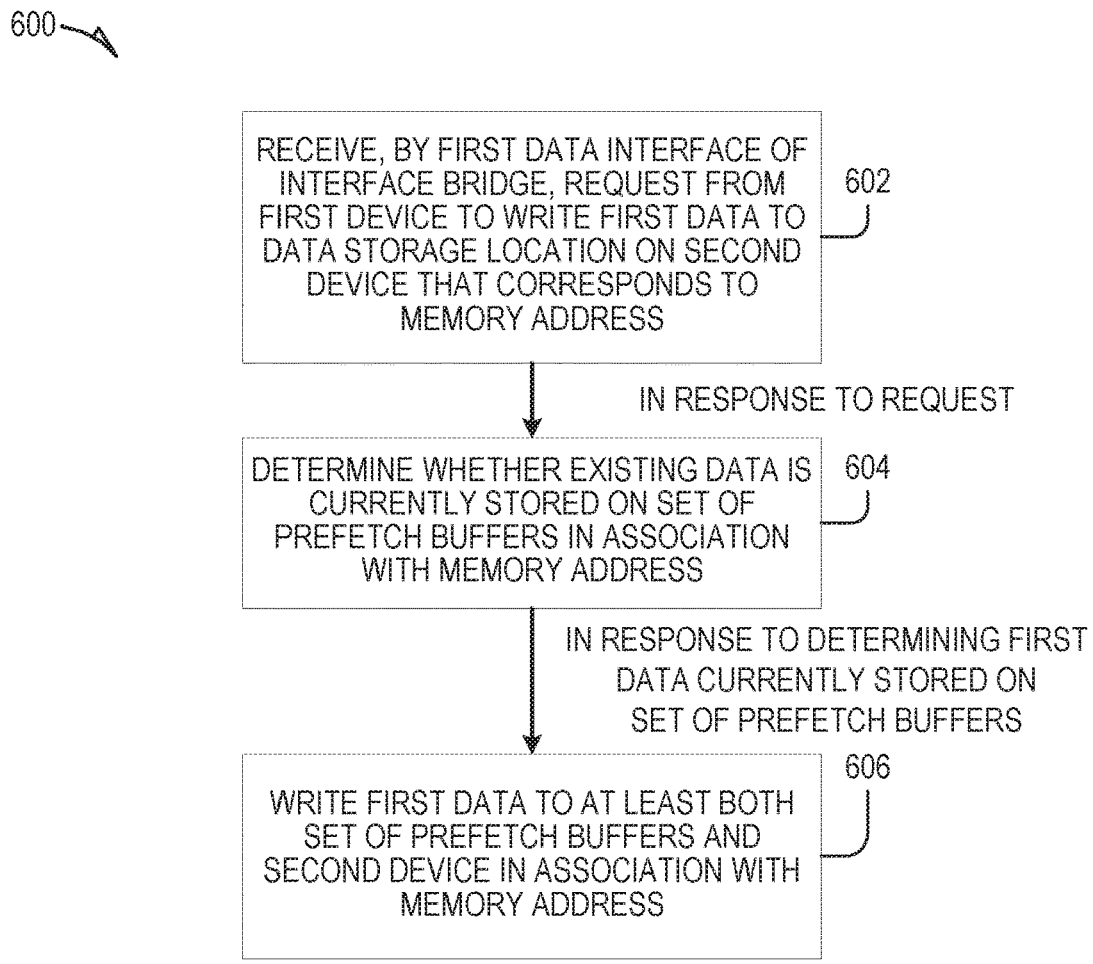

Referring now to the method 600 of FIG. 6, at operation 602, a the interface bridge (e.g., 112) receives, from a first device (e.g., 117), a request to write first data to a data storage location on a second device (e.g., 130, 140) that corresponds to a memory address. For some embodiments, the memory address is received from the host system in connection with, or as part of, the request received by operation 602. For various embodiments, the request is received by the interface bridge (e.g., 112) from the first device (e.g., 117) by the first data interface of the interface bridge (e.g., 112).

At operation 604, the interface bridge (e.g., 112) responds to the request of operation 602 by determining whether existing data is currently stored on the set of prefetch buffers (e.g., determine whether the request results in write hit on the prefetch buffer 114) in association with the memory address.

At operation 606, the interface bridge (e.g., 112) responds to the determination (by operation 604) that existing data is currently stored on the set of prefetch buffers (e.g., 114) in association with the memory address by writing the first data to at least both the set of prefetch buffers (e.g., 114) and the second device (e.g., 130, 140) in association with the memory address. For instance, the first data can be first written to the set of prefetch buffers (e.g., 114) and then be written from the set of prefetch buffers to the second device (e.g., 130, 140). In this way, the prefetch buffer (e.g., 114) can operate as a write-through buffer for some embodiments. For various embodiments, the first data is written to the second device (e.g., 130, 140) by the second data interface of the interface bridge (e.g., 112).

Figure 7:
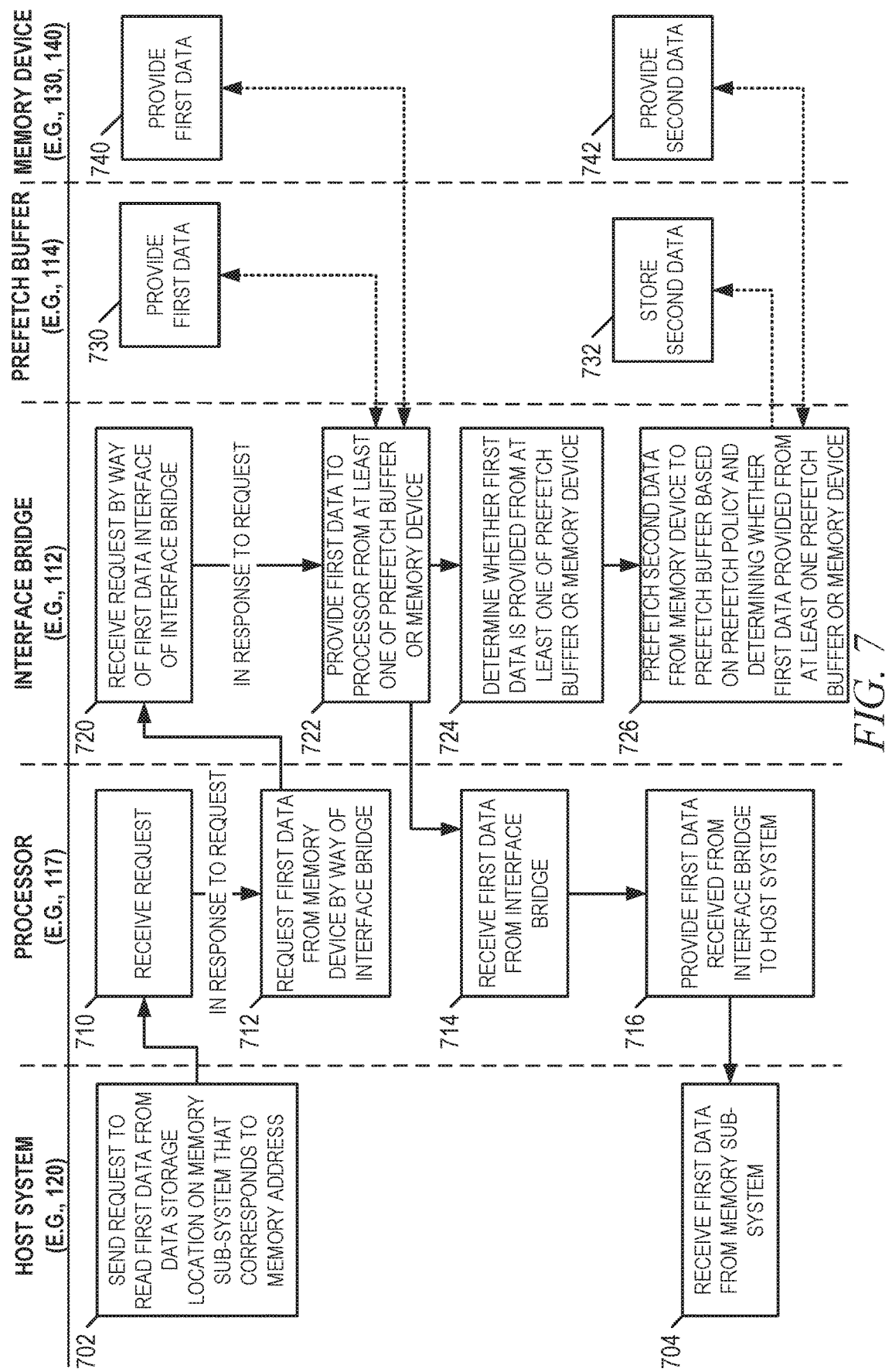
FIG. 7 provides an interaction diagram illustrating interactions between components of the computing environment in the context of some embodiments in which a method of using a prefetch buffer as described herein is performed.

FIG. 7 provides an interaction diagram illustrating interactions between components of the computing environment 100 in the context of some embodiments in which a method of using a prefetch buffer as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a processor (e.g., 117) of a memory sub-system (e.g., 110) operating as a first device, a memory device (e.g., 130, 140) operating as a second device, an interface bridge (e.g., 112) coupling the processing device and the memory device, and a prefetch buffer (e.g., 114), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. In the context of the example illustrated in FIG. 7, the host system can include the host system 120, the processor can include the processor 117 of the memory sub-system controller 115, the interface bridge can include the interface bridge 112 of the memory sub-system controller 115, the prefetch buffer can include the prefetch buffer 114, and the memory device can include the memory device 130 or 140.

As shown in FIG. 7, at operation 702, the host system 120 sends a request to read first data from a data storage location on the memory sub-system 110 that corresponds to a memory address of the memory sub-system 110. At operation 710, the processor 117 receives the request. In response to the request, at operation 712, the processor 117 requests the first data from the memory device 130, 140 by way of the interface bridge 112. At operation 720, the interface bridge 112 receives the request from the processor 117 by way of a first data interface of the interface bridge 112. In response to the request, the interface bridge 112 provides the first data to the processor 117 from at least one of the prefetch buffer 114 or the memory device 130, 140. In particular, based on the request, operation 722 can comprise searching the prefetch buffer 114 for a read hit on the memory address of the request. If a read hit results on the prefetch buffer 114, at operation 730 the prefetch buffer 114 provides the interface bridge 112 with the requested first data for the processor 117. If a read miss results on the prefetch buffer 114, at operation 740, the memory device 130, 140 provides the interface bridge 112 (via the second data interface) with the requested first data for the processor 117.

Eventually, at operation 714, the processor 117 receives the first data from the interface bridge 112 via the first data interface. At operation 716, the processor 117 provides the first data, received from the interface bridge 112, to the host system 120. Subsequently, at operation 704, the host system 120 receives the first data from the memory sub-system 110 (i.e., the processor 117).

At operation 724, the interface bridge 112 determines whether the first data is provided from at least one of the prefetch buffer 114 or the memory device 130, 140. Based on a prefetch policy and the determination of operation 724, at operation 726, the interface bridge 112 prefetches second data from the memory device 130, 140 to the prefetch buffer 114. Accordingly, at operation 742, the memory device 130, 140 provides the second data for the prefetch and, at operation 732, the prefetch buffer 114 stores the second data prefetched from the memory device 130, 140.

Figure 8:
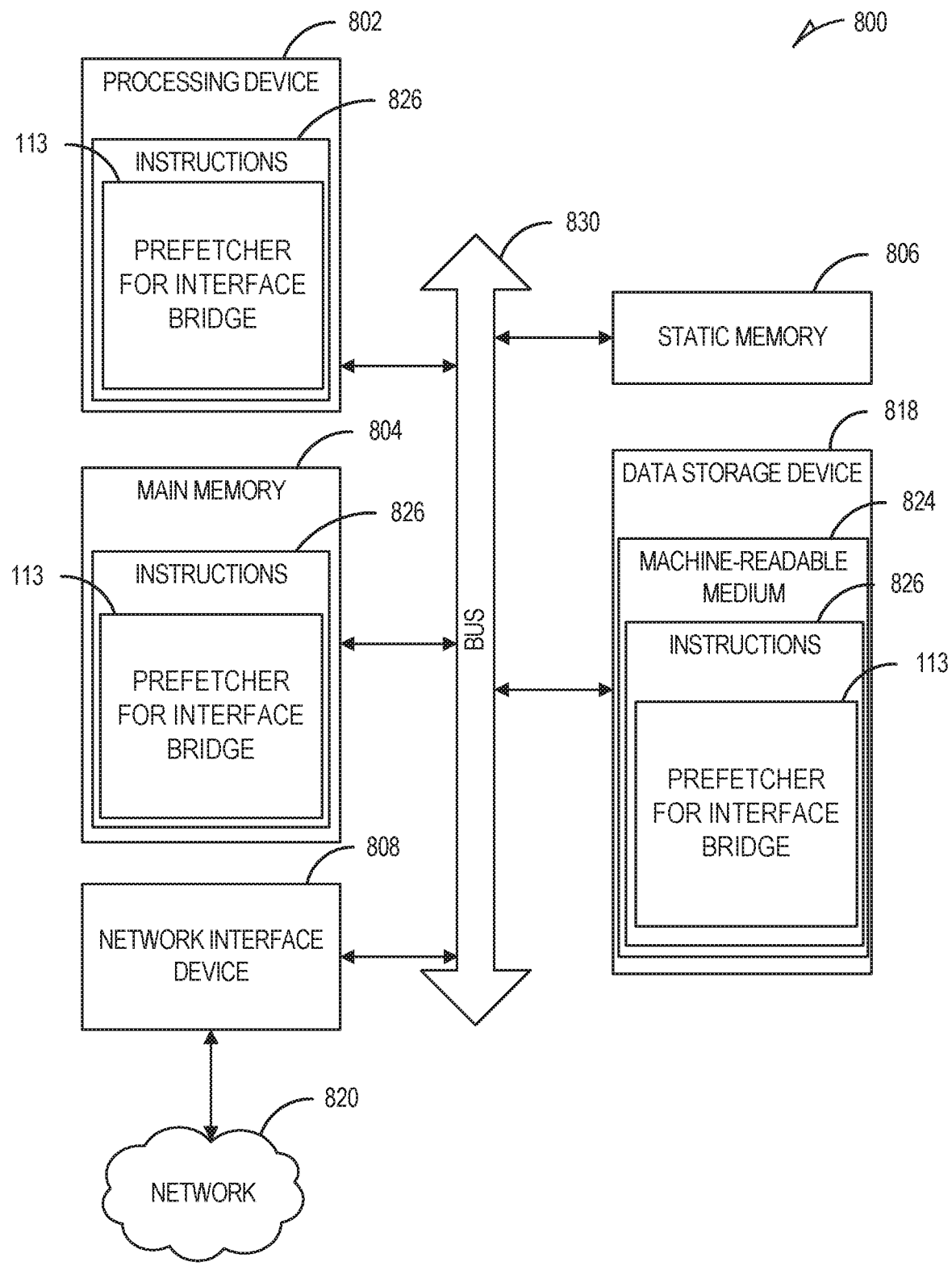
FIG. 8 is a block diagram of an example computer system in which embodiments of the present disclosure may operate.

FIG. 8 illustrates an example machine in the form of a computer system 800 within which a set of instructions can be executed for causing the machine to perform any one or more of the methodologies discussed herein. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

The processing device 802 represents one or more general-purpose processing devices such as a microprocessor, a central processing unit, or the like. More particularly, the processing device 802 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 802 can also be one or more special-purpose processing devices such as an application specific integrated circuit (ASIC), a field programmable gate array (FPGA), a digital signal processor (DSP), a network processor, or the like. The processing device 802 is configured to execute instructions 826 for performing the operations and steps discussed herein. The computer system 800 can further include a network interface device 808 to communicate over a network 820.

The data storage device 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage device 818, and/or main memory 804 can correspond to the memory sub-system 110 of FIG. 1.

In one embodiment, the instructions 826 include instructions to implement functionality corresponding to using a prefetch buffer with an interface bridge as described herein (e.g., the prefetcher 113 of FIG. 1). While the machine-readable storage medium 824 is shown, in an example embodiment, to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks. CD-ROMs. and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An interface bridge comprising:
   a deterministic data interface in accordance with a memory standard;
   a non-deterministic data interface in accordance with a data interface standard that is different from the memory standard; and
   a set of prefetch buffers, the interface bridge being configured to perform operations comprising:
      receiving, from a processing device of a memory sub-system coupled to the deterministic data interface, a request to read first data from a data storage location on a memory device of the memory sub-system coupled to the non-deterministic data interface, the data storage location corresponding to a memory address provided in association with the request; and
      in response to the request:
         providing, based on the memory address, the first data to the processing device from one of the set of prefetch buffers or the memory device, the first data being provided to the processing device by the deterministic data interface;
         determining whether the first data is provided to the processing device from at least one of the set of prefetch buffers or the memory device; and
         prefetching, based on a prefetch policy and based on the determining of whether the first data is provided to the processing device from at least one of the set of prefetch buffers or the memory device, second data from the memory device to the set of prefetch buffers through the non-deterministic data interface, the second data being stored on the memory device at a set of data storage locations corresponding to a set of sequential memory addresses, and the set of sequential memory addresses sequentially following the memory address.

2. The interface bridge of claim 1, wherein the memory standard comprises a Double Data Rate (DDR) memory standard.

3. The interface bridge of claim 1, wherein the data interface standard comprises a Peripheral Component Interconnect Express (PCI-E) standard.

4. The interface bridge of claim 1, wherein the prefetching from the memory device to the set of prefetch buffers comprises:
   in response to determining that the first data is provided to the processing device from the set of prefetch buffers:
      copying the second data from the memory device to the set of prefetch buffers.

5. The interface bridge of claim 1, wherein the providing of the first data to the processing device from one of the set of prefetch buffers or the memory device comprises:
   determining, based on the memory address, whether the first data is currently stored on the set of prefetch buffers; and
   in response to determining that the first data is currently stored on the set of prefetch buffers, providing the first data from the set of prefetch buffers to the processing device.

6. The interface bridge of claim 1, wherein the providing of the first data to the processing device from one of the set of prefetch buffers or the memory device comprises:
   determining, based on the memory address, whether the first data is currently stored on the set of prefetch buffers; and
   in response to determining that the first data is not currently stored on the set of prefetch buffers, providing the first data from the memory device to the processing device.

7. The interface bridge of claim 6, wherein the providing of the first data from the memory device to the processing device comprises:
   copying the first data from the memory device to the set of prefetch buffers; and
   providing the copy of the first data from the set of prefetch buffers.

8. The interface bridge of claim 1, wherein the operations further comprise:
receiving, from the processing device, a second request to write third data to a second data storage location on the memory device, the second data storage location corresponding to a memory address provided in association with the second request; and
in response to the second request:
determining whether existing data is currently stored on the set of prefetch buffers in association with the memory address; and
in response to determining that existing data is currently stored on the set of prefetch buffers in association with the second memory address, writing the third data to at least both the set of prefetch buffers and the memory device in association with the memory address, the third data being written to the memory device by the non-deterministic data interface.

9. The interface bridge of claim 1, wherein the set of prefetch buffers comprises at least one of a set of static random-access memory (SRAM) devices, a set of hardware registers, and a set of set-associative caches.

10. The interface bridge of claim 1, wherein the operations further comprise:
receiving an instruction from the processing device to enable or disable prefetching of data from the memory device to the set of prefetch buffers.

11. The interface bridge of claim 1, wherein the processing device is part of a memory sub-system controller of the memory sub-system.

12. The interface bridge of claim 1, wherein the request is generated by the processing device based on another request from a host system to the processing device.

13. The interface bridge of claim 1, wherein the memory device is a non-volatile memory device.

14. The interface bridge of claim 13, wherein the non-volatile memory device comprises a NAND-type memory device.

15. A method comprising:
receiving, by a deterministic data interface of an interface bridge, a request from a processing device of a memory sub-system to read first data from a data storage location on a memory device of the memory sub-system that corresponds to a memory address, the processing device being coupled to the deterministic data interface, the memory device being coupled to a non-deterministic data interface of the interface bridge, the deterministic data interface being in accordance with a memory standard, and the non-deterministic data interface in accordance with a data interface standard that is different from the memory standard; and
in response to the request:
providing, by the interface bridge and based on the memory address, the first data to the processing device from one of the memory device or a set of prefetch buffers of the interface bridge, the first data being provided to the processing device by the deterministic data interface;
determining whether the first data is provided to the processing device from at least one of the set of prefetch buffers or the memory device; and
prefetching, based on a prefetch policy and based on the determining of whether the first data is provided to the processing device from at least one of the set of prefetch buffers or the memory device, second data from the memory device to the set of prefetch buffers through the non-deterministic data interface, the second data being stored on the memory device at a set of data storage locations corresponding to a set of sequential memory addresses, and the set of sequential memory addresses sequentially following the memory address.

16. The method of claim 15, wherein the memory standard comprises a Double Data Rate (DDR) memory standard.

17. The method of claim 15, wherein the data interface standard comprises a Peripheral Component Interconnect Express (PCI-E) standard.

18. The method of claim 15, wherein the prefetching from the memory device to the set of prefetch buffers comprises:
in response to determining that the first data is provided to the processing device from the set of prefetch buffers:
copying the second data from the memory device to the set of prefetch buffers.

19. The method of claim 15, wherein the providing of the first data to the processing device from one of the set of prefetch buffers or the memory device comprises:
determining, based on the memory address, whether the first data is currently stored on the set of prefetch buffers; and
in response to determining that the first data is currently stored on the set of prefetch buffers, providing the first data from the set of prefetch buffers to the processing device.

20. At least one non-transitory machine-readable medium comprising instructions that, when executed by an interface bridge, cause the interface bridge to perform operations comprising:
receiving, from a processing device of a memory sub-system coupled to a deterministic data interface of the interface bridge, a request to read first data from a data storage location on a memory device coupled to a non-deterministic data interface of the interface bridge, the data storage location corresponding to a memory address provided in association with the request, the deterministic data interface being in accordance with a memory standard, the non-deterministic data interface being in accordance with a data interface standard that is different from the memory standard; and
in response to the request:
providing, based on the memory address, the first data to the processing device from one of the memory device or a set of prefetch buffers of the interface bridge, the first data being provided to the processing device by the deterministic data interface;
determining whether the first data is provided to the processing device from at least one of the set of prefetch buffers or the memory device; and
prefetching, based on a prefetch policy and based on the determining of whether the first data is provided to processing device from at least one of the set of prefetch buffers or the memory device, second data from the memory device to the set of prefetch buffers, the second data being stored on the memory device at a set of data storage locations corresponding to a set of sequential memory addresses, and the set of sequential memory addresses sequentially following the memory address.

* * * * *